United States Patent [19]

Van Hoek et al.

[11] Patent Number: 4,899,061
[45] Date of Patent: Feb. 6, 1990

[54] DETERMINING A WIDTH AND/OR THICKNESS OF A GENERALLY RECTANGULAR OBJECT

[75] Inventors: Hendrik C. Van Hoek, Wantirna; Daryl N. Williams, Mount Waverley, both of Australia

[73] Assignee: The Broken Hill Proprietary Company Limited, Victoria, Australia

[21] Appl. No.: 191,143
[22] PCT Filed: Jul. 27, 1987
[86] PCT No.: PCT/AU87/00237
§ 371 Date: Mar. 11, 1988
§ 102(e) Date: Mar. 11, 1988
[87] PCT Pub. No.: WO88/01366
PCT Pub. Date: Feb. 25, 1988

[30] Foreign Application Priority Data

Aug. 13, 1986 [AU] Australia ............................ PH07429

[51] Int. Cl.$^4$ .............................................. G01N 21/86
[52] U.S. Cl. ..................................... 250/560; 356/387
[58] Field of Search ................ 250/560, 561; 356/384, 356/385, 386, 387, 376, 380

[56] References Cited

U.S. PATENT DOCUMENTS 4,319,270 3/1982 Kimura et al. ........................ 250/560
4,381,152 4/1983 Riech et al. .......................... 356/385

Primary Examiner—David C. Nelms
Attorney, Agent, or Firm—Armstrong, Nikaido, Marmelstein, Kubovcik & Murray

[57] ABSTRACT

At least two cameras (10,12) view two points (A,B) displaced by a known distance on an article (S). Using a known relationship between two points (A,B) and the known position of cameras (10,12) in space the location of the viewed points (A,B) in space are determined by calculation. Similarly, the coordinates of other points on to article (S) are determined and hence dimensions such as width are determined.

7 Claims, 2 Drawing Sheets

DETERMINING A WIDTH AND/OR THICKNESS OF A GENERALLY RECTANGULAR OBJECT

FIELD OF THE INVENTION

This invention relates to a method and apparatus for determining a dimension of an article such as the width or thickness of a plate or slab produced in a steel mill.

SUMMARY OF THE INVENTION

The invention may be said to reside in a method of determining a dimension of an article, the method comprising the steps of viewing two points on the article with a sensing device, the two points being displaced by a known relationship, using the known relationship and the two viewed points to determine the location in space of one of the points, and using the absolute location in space of another point determining the dimension of the article between the one point and the another point.

The invention may also be said to reside in an apparatus for determining the dimension of an article, the apparatus comprising two sensing device each sensing one of two points on the article which are displaced by a known relationship, a processing device for resolving the location in space of one of the two points and for determining the distance between one point and another point to enable a dimension of the article to be determined.

The another point could be a known fixed point. However according to the preferred embodiments of the invention, the another point is determined by viewing a second pair of points including the another point, the second pair of points being displaced by a further known relationship and determining the location in space of the another point from the viewed second pair of points and the further known relationship.

Preferably two sensing device each view one of the first two points and a further two sensing device each view one of the second two points. However only two sensing device could be used with one sensing device viewing one of the first two points and one of the second two points and the other sensing device viewing the other of the first two points and the other of the second two points. In one embodiment of the invention the two pair of points, which are displaced by a known distance, can comprise points at the edges of a generally rectangular cross-sectioned article, and in a second embodiment, the pairs of points can be points on an arc of a circle of a curved portion of the article.

BRIEF DESCRIPTION OF THE DRAWINGS

Preferred embodiment of the invention will be described with reference to the accompanying drawings in which.

DESCRIPTION OF THE PREFERRED EMBODIMENTS

Figure 1:
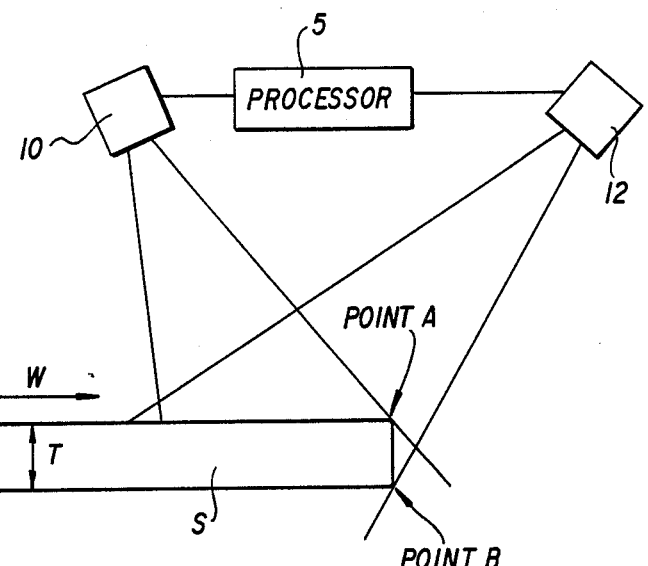
FIG. 1 is a view of the first embodiment of the invention.

With reference to FIG. 1 a system is shown for determining the width W of a plate or slab of a generally rectangular cross-section. The system comprises a first sensor means comprising a first linescan camera 10 and a second linescan camera 12. Located at the other end of the plate or slab S is a second pair of linescan cameras (which are not shown). The linescan camera 10 views the point A at the top edge of the slab S and the linescan camera 12 views the point B at the bottom edge of the slab S. The slab S could be hot enough to provide illumination for the cameras 10 and 12 or a back light (not shown) could be utilized.

The points A and B are displaced by the known thickness T of the slab S and are assumed to be vertically displaced, one above the other. Since the thickness T of the slab S is known and the points A and B are vertically displaced, a computing apparatus 5 coupled to the linescan cameras 10 and 12 can resolve the location of point A in space from the images in the cameras. The other pair of linescan cameras (not shown) at the other end of the slab S resolve the location of a corresponding point A at the top edge of the slab in a similar manner. Since the location in space of two points at the edges of the slab S are known, the distance between the two points can be determined by simple geometry to enable the width W of the slab to be determined.

Figure 2:
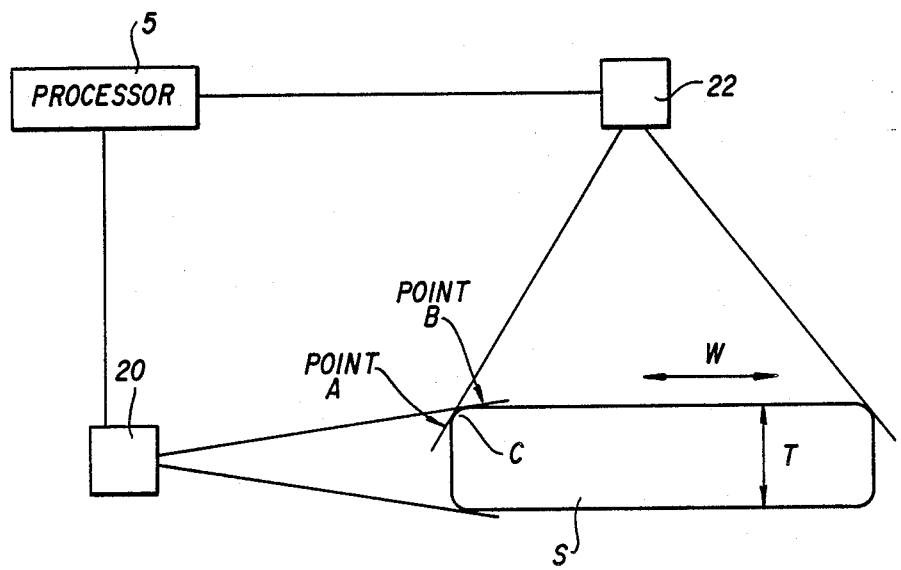
FIG. 2 is a view of a second embodiment of the invention.

A second embodiment of the invention is shown in FIG. 2 in which linescan cameras 20 and 22 view a slab S which has rounded corners C. As shown the points A and B viewed by the cameras 20 and 22 are points on the arc of a circle C where the arc of the circle C meets the substantially flat top and side surfaces of the slab S. The corner radius of the curved portion C is a function of rolling practice and is predictable. Therefore the corner radius of the section C is known and the points A and B are displaced by a known distance on the arc of the curved section C. Since the points A and B are displaced by a known distance, the location in space of the point A or the point B can be resolved from the images in the linescan cameras 20 and 22.

Another sensing means which can comprise another pair of linescan cameras or a further linescan camera in combination with one of the cameras 20 or 22 can inspect points on another corner radius of the slab S so that another point at that corner can be resolved in space to enable a dimension of the slab S to be determined. That dimension could be the width W of the slab or the thickness T of the slab depending on which other corner of the slab is viewed.

The arrangement illustrated in FIG. 2 could also be used to measure an unknown diameter of a round article by use of the knowledge that two edges seen by each of the cameras are points on a circle.

Figure 3:
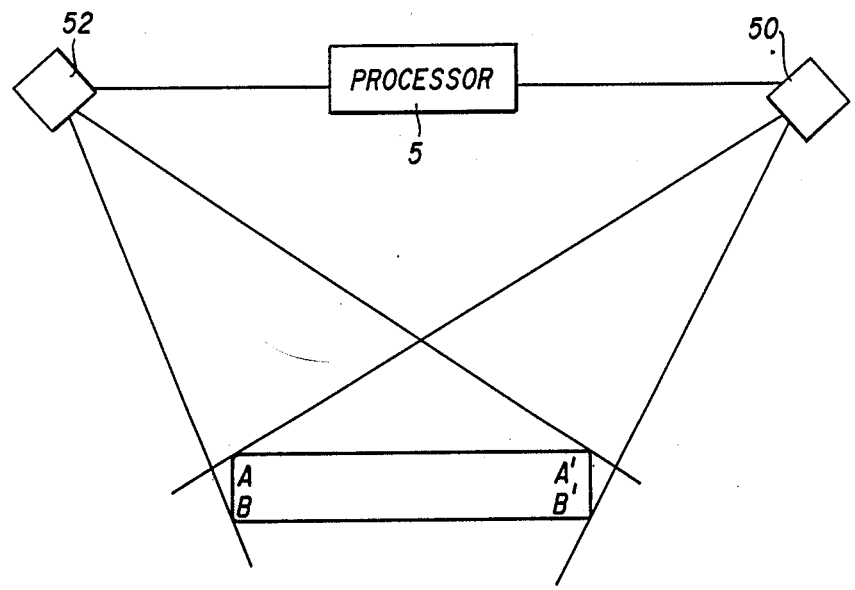
FIG. 3 shows a third embodiment.

In FIG. 3 a further embodiment is shown in which only two cameras are used. One camera 50 views one point A of a pair of points A and B displaced by a known distance and also view one point B' of a second pair of points A' and B' displaced by a known distance. The second camera 52 views the remaining two points B and A'. The location in space of one of each pair of points A and B and A' and B' is determined in the same manner as described above to enable a dimension of the article to be obtained.

Figure 4:
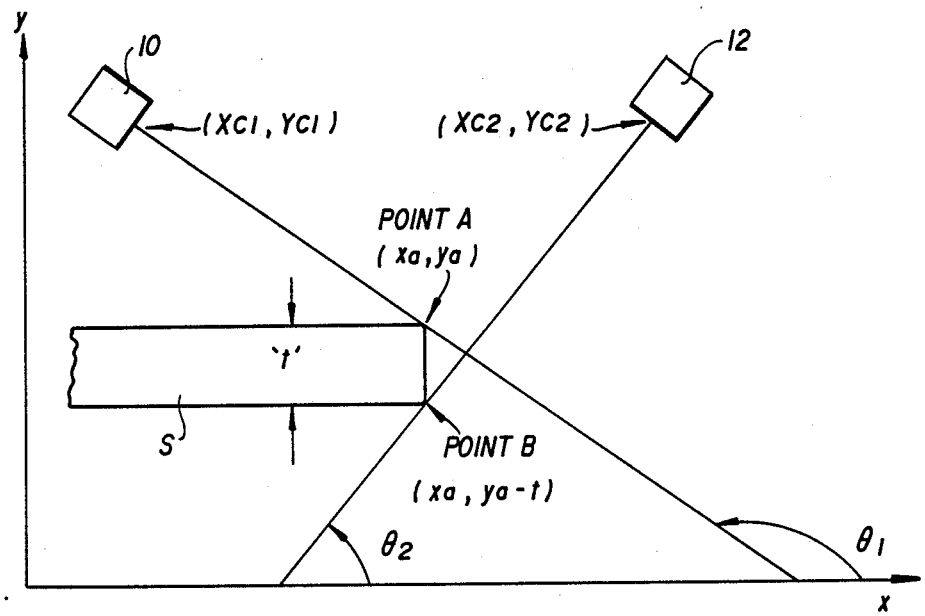
FIG. 4 shows one preferred manner of making calculations according to the preferred embodiment.

One manner of calculating the location of points A and B will be described with reference to FIG. 4. Using FIG. 4, Xc, Yc, A, B, P, K are calibration constants determined in the manner set forth in our Australian Patent Application No. 41143/85 which is hereby incorporated by this reference. M is the image location or camera pixel number corresponding to an edge seen on the object. From the above application we have the following relationship which locates the position of an object coordinate in terms of distances $x_d$ and $y_d$ from the principal point of the lens where $x_d$ and $y_d$ are determined as follows:

$$x_d = K y_d \left( \frac{M}{B + AM} - P \right) \quad \text{(i)}$$

using equation (i) the coordinates of an object point ($x_o$, $y_o$) in a cartesian reference frame as above are related as follows:

$$\frac{Y_c - y_o}{X_c - x_o} = \tan \theta_o = K \left( \frac{M^1}{B + AM} - P \right) \quad \text{(ii)}$$

$\theta_o$ is the angle of a ray drawn from principal point of the camera lens to the object coordinate with respect to the X axis. From the diagram above the following relationships for the object edge coordinates A and B can be derived with respect to the origin of the cartesian reference frame.

$$y_a = \tan \theta_1 (x_a - X_{c1}) + Y_{c1} \quad \text{(iii)}$$

$$y_a - t = \tan \theta_2 (x_a - X_{c2}) + Y_{c2} \quad \text{(iv)}$$

Combining (iii) and (iv) to eliminate $y_a$ gives the location $x_a$ in terms of calibration constants, plate thickness and measure variables.

$$x_a = \frac{X_{c2} \tan \theta_2 - X_{c1} \tan \theta_1 + Y_{c1} - Y_{c2} - t}{\tan \theta_2 - \tan \theta_1} \quad \text{(v)}$$

Since modification within the spirit and scope of the invention may readily be effected by persons skilled within the art, it is to be understood that this invention is not limited to the particular embodiment described by way of example hereinabove.

We claim:

1. A method of determining a dimension of an article, said method comprising the steps of:
   viewing four points on the article with a sensing means to obtain image positions of said four points, said four points comprising first and second pairs of points being displaced by known relationships;
   using the known relationships between the first pair of points and the image positions of the first pair of points to determine a location in space of one of said first pair of points;
   using the known relationships between the second pair of points and the image positions of the second pair of points to determine a location in space of one of said second pair of points; and
   using the location in space of the said one point of the first pair of points and the location in space of the said one point of the second pair of points to determine a dimension of said article between said one point of the first pair of points and said one point of the second pair of points.

2. The method of claim 1, wherein a first pair of sensing means each one viewing one of the first pair of points and a second pair of sensing means each one viewing one of the second pair of points.

3. The method of claim 2, wherein said first pair of sensing means are used with one of said sensing means viewing one of the first pair of points and viewing one of the second pair of points and the other of said pair of sensing means viewing the other of the first pair of points and viewing the other of the second pair of points.

4. The method of claim 1, wherein the four points comprise points at the edges of a generally rectangular cross-sectioned article and the known relationships comprise the known thickness of the article.

5. The method of claim 1, wherein the location of the first pair of points ($x_a$, $Y_a$); ($x_a$, $Y_{a-b}$) are derived from the following equations wherein, $x_c$, $Y_c$ are calibration constants, $\theta$ is the angle of a ray drawn from principal point of the sensing means to the object coordinate with respect to the X axis, and the subscript 1, 2 denote the respective sensing means;

$$y_a = \tan \theta_1 (x_a - X_{c1}) + Y_{c1} \quad \text{(iii)}$$

$$y_a - t = \tan \theta_2 (x_a - X_{c2}) + Y_2 \quad \text{(iv)}$$

$$x_a = \frac{X_{c2} \tan \theta_2 - X_{c1} \tan \theta_1 + Y_{c1} - Y_{c2} - t}{\tan \theta_2 - \tan \theta_1} \quad \text{(v)}$$

6. The method of claim 1, wherein the first and second pair of points are on arcs of circles of curved portions of the article and the known relationships are the radius of the arcs of the circles.

7. An apparatus for determining a dimension of an article, said apparatus comprising:
   sensing means for sensing a first and a second pair of points on said article and for providing image positions of said points, the first and second pair of points being displaced by known relationships; and
   processing means, coupled to said sensing means, for resolving a location in space of one of said first pair of points from said known relationships between the first pair of points and the image positions of the first pair of points, said processing means also for resolving a location in space of one of the points of the second pair of points from the known relationships between the second pair of points and the image positions of the second pair of points, said processing means for determining a distance between one point of the first pair of points and one point of the second pair of points to enable a dimension of the article to be determined.

* * * * *